(12) United States Patent
Kitayama et al.

(10) Patent No.: US 7,118,153 B2
(45) Date of Patent: Oct. 10, 2006

(54) FRAME STRUCTURE FOR VEHICLE TAILGATE

(75) Inventors: Kenichi Kitayama, Dublin, OH (US); Christopher Walker, Hilliard, OH (US); Steven Thiele, Marysville, OH (US); Edward Moran, Dublin, OH (US); Marc Lamarre, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 10/663,138

(22) Filed: Sep. 16, 2003

(65) Prior Publication Data

US 2005/0057064 A1 Mar. 17, 2005

(51) Int. Cl.
*B62D 33/03* (2006.01)

(52) U.S. Cl. .................... 296/57.1; 296/51; 296/146.5; 296/146.12

(58) Field of Classification Search ............... 296/50, 296/57.1, 51, 146.5, 146.12; 49/192
See application file for complete search history.

(56) References Cited

U.S. PATENT DOCUMENTS

| | | | |
|---|---|---|---|
| 1,689,472 A | 10/1928 | Barrows | |
| 2,806,735 A * | 9/1957 | Smith | 296/51 |
| 3,184,263 A | 5/1965 | Plegat | |
| 3,387,406 A | 6/1968 | Coker et al. | |
| 4,283,083 A * | 8/1981 | Johnson | 296/37.1 |
| 4,968,084 A * | 11/1990 | Asher et al. | 296/50 |
| 5,000,503 A | 3/1991 | Bernatek | |
| 5,169,201 A | 12/1992 | Gower | |
| 5,372,397 A | 12/1994 | Arndt | |
| 5,536,060 A | 7/1996 | Rashid et al. | |
| 5,644,870 A | 7/1997 | Chen | |
| 5,660,427 A * | 8/1997 | Freeman et al. | 296/190.08 |
| 5,685,594 A * | 11/1997 | Harper | 296/51 |
| 5,741,039 A | 4/1998 | Habdas | |
| 5,944,373 A * | 8/1999 | Seksaria et al. | 296/57.1 |
| 5,947,540 A * | 9/1999 | Pariseau et al. | 296/57.1 |
| 6,079,766 A * | 6/2000 | Butler et al. | 296/146.5 |
| 6,227,594 B1 | 5/2001 | Pommeret | |
| 6,293,602 B1 * | 9/2001 | Presley | 296/26.11 |
| 6,431,630 B1 | 8/2002 | Meinke | |
| 6,471,279 B1 | 10/2002 | Pommeret | |
| 6,672,642 B1 * | 1/2004 | Seksaria et al. | 296/50 |
| 6,676,187 B1 * | 1/2004 | Miskech et al. | 296/50 |
| 6,764,130 B1 * | 7/2004 | Hull | 296/186.4 |
| 6,776,449 B1 * | 8/2004 | Komatsu et al. | 296/146.5 |

(Continued)

FOREIGN PATENT DOCUMENTS

JP 59-186784 10/1984

(Continued)

OTHER PUBLICATIONS

Kissell, Randolph, Aluminum and Its Alloys, Marks' Standard Handbook for Mechanical Engineers: Section 6- Materials of Engineering, 1996, New York, McGraw-Hill, 10th Edition, pp. 6-53 though 6-56.*

*Primary Examiner*—Jason Morrow
(74) *Attorney, Agent, or Firm*—Fay, Sharpe, Fagan, Minnich & McKee, LLP

(57) ABSTRACT

A tailgate assembly adapted to be mounted along an open edge of a vehicle's load-carrying bed includes a stamped sheet metal frame having a reinforced cross-sectional shape with an inner side facing an associated vehicle's load-carrying bed and an outer side opposite the inner side. The tailgate assembly further includes a skin attached to the outer side of the frame.

22 Claims, 4 Drawing Sheets

U.S. PATENT DOCUMENTS

2001/0013710 A1   8/2001   Pommeret
2004/0084925 A1*  5/2004   Ojanen ..................... 296/50

FOREIGN PATENT DOCUMENTS

WO    WO 02/066313 A1 *  8/2002

* cited by examiner

FRAME STRUCTURE FOR VEHICLE TAILGATE

BACKGROUND OF THE INVENTION

1. Filed of the Invention

The present invention relates to a tailgate for a vehicle. More particularly, the present invention relates to a dual-mode tailgate having an improved frame structure. The present invention finds particular application as a tailgate for a pick-up truck and will be described with particular reference thereto. However, it is to be appreciated that the invention may relate to other similar environments and applications.

2. Description of the Prior Art

Dual-mode tailgates are generally known. For example, U.S. Pat. No. 3,387,406 issued to Coker discloses a dual-mode tailgate for use on a station wagon. "Dual-mode" refers to the two directions or pivot axes along which a dual-mode tailgate is openable. More particularly, a dual-mode tailgate is selectively openable in a first, fold-down direction about an axis generally parallel with a bottom edge of the tailgate similar to a conventional pick-up truck tailgate. The dual-mode tailgate is also selectively openable in a second, side-to-side direction about an axis generally parallel with a lateral edge of the tailgate.

It has been proposed to include a dual-mode tailgate in a heavy duty vehicle designed to carry large loads and/or heavy load-bearing cargo. For example, a dual-mode tailgate could be employed in a pick-up truck, a hybrid vehicle that includes a pick-up style bed or other similar vehicle. However, heretofore, most dual-mode tailgates were only employed in light duty vehicles such as station wagons, traditional sport utility vehicles (SUVs) and the like. Thus, the prior art dual-mode tailgates are generally not designed to accommodate large loads or load-bearing cargo and are unsuitable for use on vehicles intended to carry heavy loads.

More particularly, the prior art dual-mode tailgates generally do not have a structural strength sufficient for supporting a relatively heavy load without increasing the likelihood of damage to the tailgate or the vehicle carrying the tailgate, particularly when the tailgate is in its fold-down position. Accordingly, there is a need for a dual-mode tailgate having a relatively high structural strength compared to prior art dual-mode tailgates, particularly when the tailgate is used in its fold-down position.

Additionally, prior art dual-mode tailgates generally have a torsional stiffness and strength that is insufficient to meet the demands required of a tailgate employed in a heavy duty application. Likewise, conventional single-mode tailgates generally do not have sufficient torsional stiffness and strength due, at least in part, to their reliance on a pair of full-time support cables extending from the lateral ends of the tailgate. Thus, there is a further need for a dual mode tailgate that has an increased torsional stiffness and strength.

More particularly, dual-mode tailgates generally cannot have a pair of full-time support cables extending from the lateral sides of the tailgate because the dual-mode tailgate needs to be able to swing open. Thus, it is desirable for the dual-mode tailgate employed in a heavy duty vehicle to be sufficiently torsionally stiff and strong such that it could be optionally supported with only a single support cable when in the fold-down position.

The need for increased torsional stiffness and strength are necessitated by the possibility of one lateral edge of the dual-mode tailgate being unsupported away from a fold-down axis when the tailgate is in the fold-down position. For example, if any downward loading is applied near the distal end of the unsupported lateral edge, i.e., the outer corner of the tailgate adjacent the unsupported lateral edge, a relatively large torsional force or load will act across the tailgate. To absorb any such large torsional loads, the tailgate structure is desirably torsionally stiff and strong for purposes of preventing damage to the tailgate and/or the vehicle carrying the tailgate. It is further desirable, due to preferred design parameters, to provide a dual-mode tailgate with increased torsional stiffness and strength without unduly increasing the thickness of the tailgate. Additionally, any improvements that reduce manufacturing costs, increase manufacturing efficiency, decrease the overall weight of the tailgate while maintaining or improving the hem quality of the tailgate and the fit and finish of the overall vehicle and/or improve the reliability of the tailgate are also deemed desirable.

SUMMARY OF THE INVENTION

The present invention provides a new and improved tailgate assembly that overcomes the foregoing difficulties and others and provides the aforementioned and other advantageous features. More particularly, in accordance with one aspect of the present invention, a tailgate assembly is adapted to be mounted along an open edge of a vehicle's load-carrying bed. The tailgate assembly includes a stamped sheet metal frame having a reinforced cross-sectional shape with an inner side facing an associated vehicle's load-carrying bed and an outer side opposite the inner side. A skin is attached to the outer side of the frame.

According to another aspect of the present invention, a vehicle closure structure is provided. More particularly, in accordance with this aspect of the invention, the vehicle closure structure includes a frame having a double-hat shape including a raised section and an inner flange and an outer flange flanking the raised section. A sheet molding compound structural cladding is adjacent and connected to the raised section of the frame. A skin is adjacent and connected to the outer flange of the frame.

According to still another aspect of the present invention, a vehicle load-carrying bed is provided. More particularly, in accordance with this aspect of the invention, the vehicle load-carrying bed includes a generally rectangular bed floor. A front wall extends upwardly adjacent a front edge of the bed floor. A first side wall extends upwardly adjacent a first side edge of the bed floor. A second side wall extends upwardly adjacent a second, opposite side edge of the bed floor. A dual-axis tailgate is positioned along a rear edge of the bed floor and extends between the first and second sidewalls. The tailgate is pivotally movable about an axis generally parallel with the rear edge of the bed floor and about an axis generally parallel with a vehicle bed edge of the first side wall. The tailgate includes a sheet metal frame having an embossed area for increasing the rigidity of the tailgate. A cladding is attached to a first side of the frame facing the front wall. A skin is attached to a second, opposite side of the frame.

BRIEF DESCRIPTION OF THE DRAWINGS

The invention may take physical form in various components and arrangements of components, and in various steps and arrangements of steps. The drawings are only for purposes of illustrating a preferred embodiment of the invention and are not to be construed as limiting the invention.

DETAILED DESCRIPTION OF THE INVENTION

Figure 1:
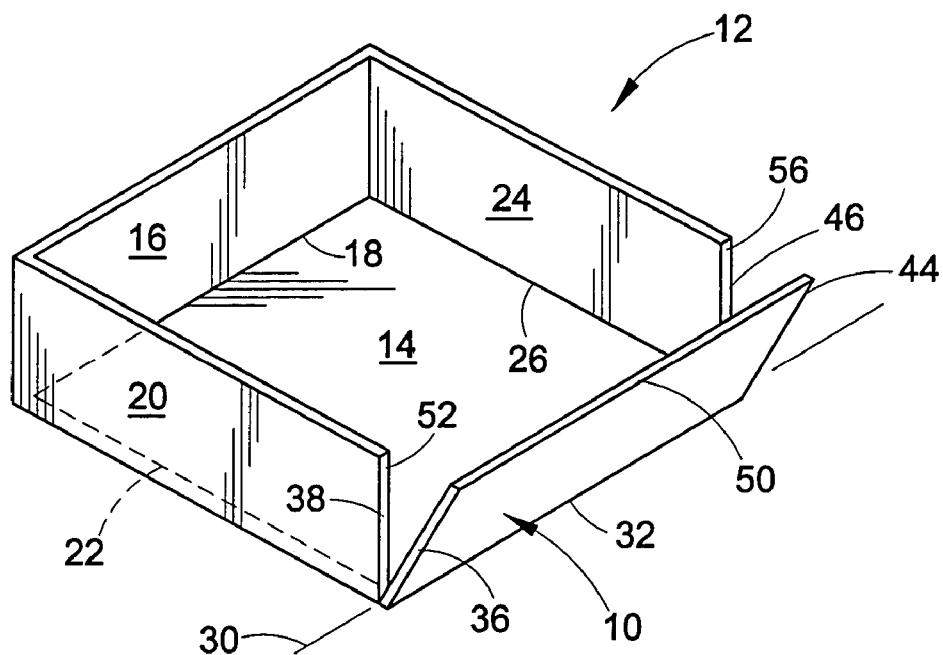
FIG. 1 is a schematic perspective view of a dual-mode pick-up truck tailgate opening in a first, fold-down direction according to a preferred embodiment of the present invention.
Figure 2:
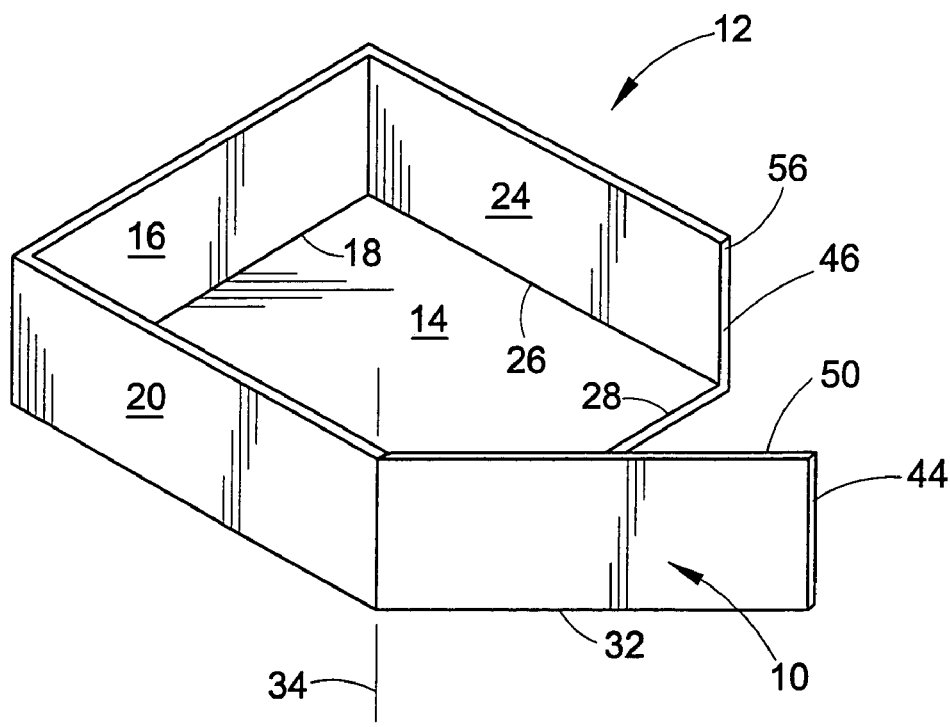
FIG. 2 is a schematic perspective view of the dual-mode pick-up truck tailgate of FIG. 1 opening in a second, side-to-side direction.

Referring now to the drawings wherein the showings are for purposes of illustrating preferred embodiments of the invention only and not for purposes of limiting the same, with reference to FIGS. 1 and 2, a dual-mode tailgate 10 is shown as a component of a vehicle's load-carrying bed 12 according to a preferred embodiment of the present invention. More particularly, the bed 12 includes a generally rectangular bed floor 14 having a plurality of walls extending upwardly adjacent three edges of the floor 14. Specifically, a front wall 16 extends upwardly adjacent a front edge 18 of the bed floor 14. A first side wall 20 extends upwardly adjacent a first side edge 22 of the bed floor 14. A second side wall 24 extends upwardly adjacent a second side edge 26 (opposite the first side edge 22) of the bed floor 14.

The dual-mode or dual-axis tailgate 10, also referred to herein as a tailgate assembly and a vehicle closure structure, is positioned along a open, rear edge 28 of the bed floor 14. More particularly, the tailgate 10 extends between the first and second sidewalls 20,24 to selectively close an open end of the load-carrying bed 12. With specific reference to FIG. 1, the tailgate 10 is able to pivot about a first axis 30 for movement between a closed position and a fold-open position. The first axis 30 is generally parallel with the rear edge 28 of the bed floor 14 and a bottom edge 32 of the tailgate 10. With specific reference to FIG. 2, the tailgate 10 is also alternatively able to pivot about a second axis 34 for movement between the closed position and a swing-open position. The second axis 34 is generally parallel with a first lateral edge 36 of the tailgate and a vehicle bed edge 38 of the first side wall 20.

Figure 3:
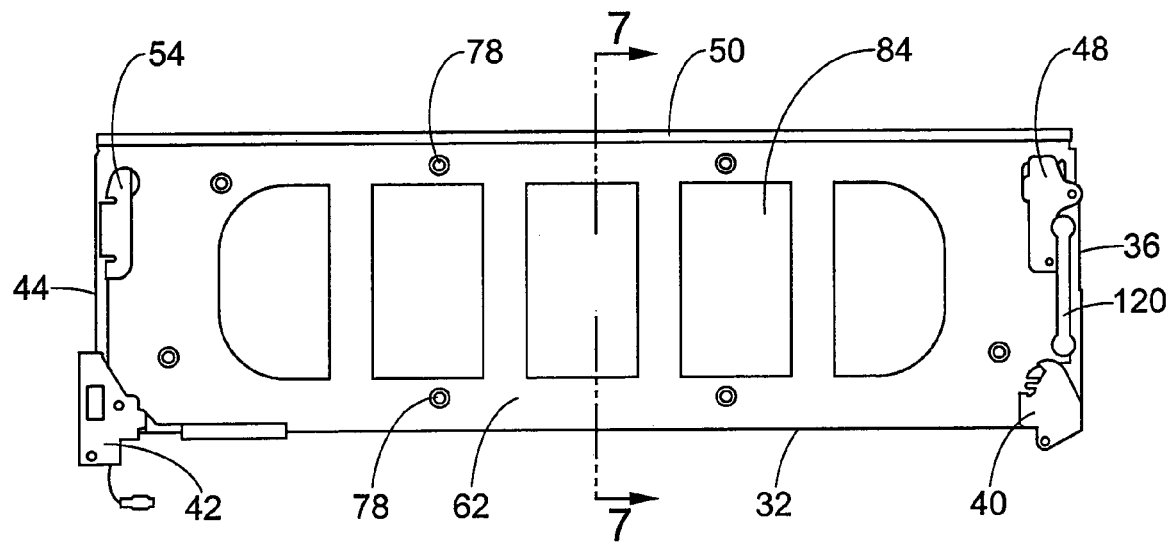
FIG. 3 is an elevational view of the tailgate of FIG. 1 showing an interior side of the tailgate having cladding.

To facilitate the dual-mode action of the tailgate 10, with additional reference to FIG. 3, a dual-mode hinge assembly 40 attaches to the tailgate 10 at a corner thereof formed at the intersection of the bottom edge 32 and the first lateral edge 36 of the tailgate 10. The dual-mode hinge assembly 40 pivotally connects the tailgate 10, along the first and second axes 30,34, to the end edge 38 of the first side wall 20 adjacent the rear edge 28 of the bed floor 14.

A first selectively operable hinge 42 attaches to the tailgate 10 at a corner thereof formed at the intersection of the bottom edge 30 and a second lateral edge 44 of the tailgate 10. When operable, the first selectively operable hinge 42 pivotally connects the tailgate 10 to an end edge 46 of the second side wall 24 adjacent the rear edge 28 of the bed floor 14. The first selectively operable hinge 42 cooperates with the dual-mode hinge assembly 40 to pivotally support the tailgate 10 along the first axis 30 when it is moved between the closed position and the fold-open position.

A second selectively operable hinge 48 attaches to the tailgate 10 at a corner thereof formed at the intersection of the first lateral edge 36 and a top edge 50 of the tailgate 10. When operable, the second selectively operable hinge 48 pivotally connects the tailgate 10 to an upper end 52 of the first sidewall end edge 38. The second selectively operable hinge 48 cooperates with the dual-mode hinge assembly 40 to pivotally support the tailgate 10 along the second axis 34 when it is moved between the closed position and the swing-open position.

A striker assembly 54 further attaches to the tailgate 10 at a corner thereof formed at the intersection of the top edge 50 and the second lateral edge 44 of the tailgate 10. The striker assembly 54 connects the tailgate to an upper end 56 of the second sidewall end edge 42 when the tailgate 10 is in the closed position.

Figure 4:
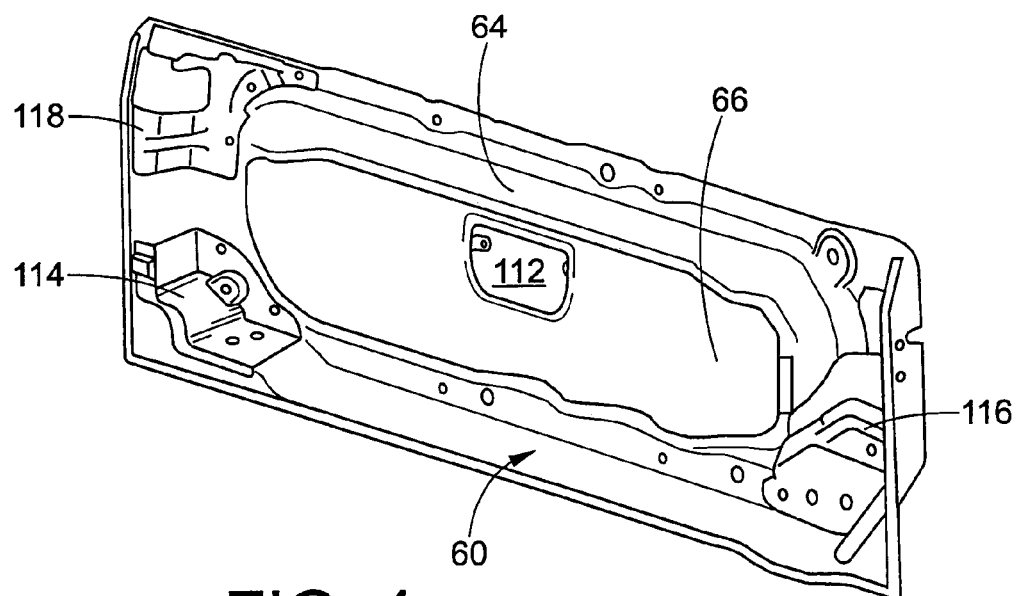
FIG. 4 is an perspective view of the tailgate of FIG. 3 shown with the cladding removed.

With continued reference to FIG. 3 and additional reference to FIG. 4, the tailgate 10 includes a tailgate frame 60, a structural cladding 62 attached to a first side 64 of the frame 60 and a skin 66 attached to second, opposite side 68 (FIG. 6) of the frame 60. With reference back to FIGS. 1 and 2, the first or inner side 64 of the frame 60 is the side facing the front wall 16 of the bed 12 and the second or outer side 68 is on the exterior side of the tailgate 10 which is visible from a rear of a vehicle having the load-carrying bed 12.

Figure 7:
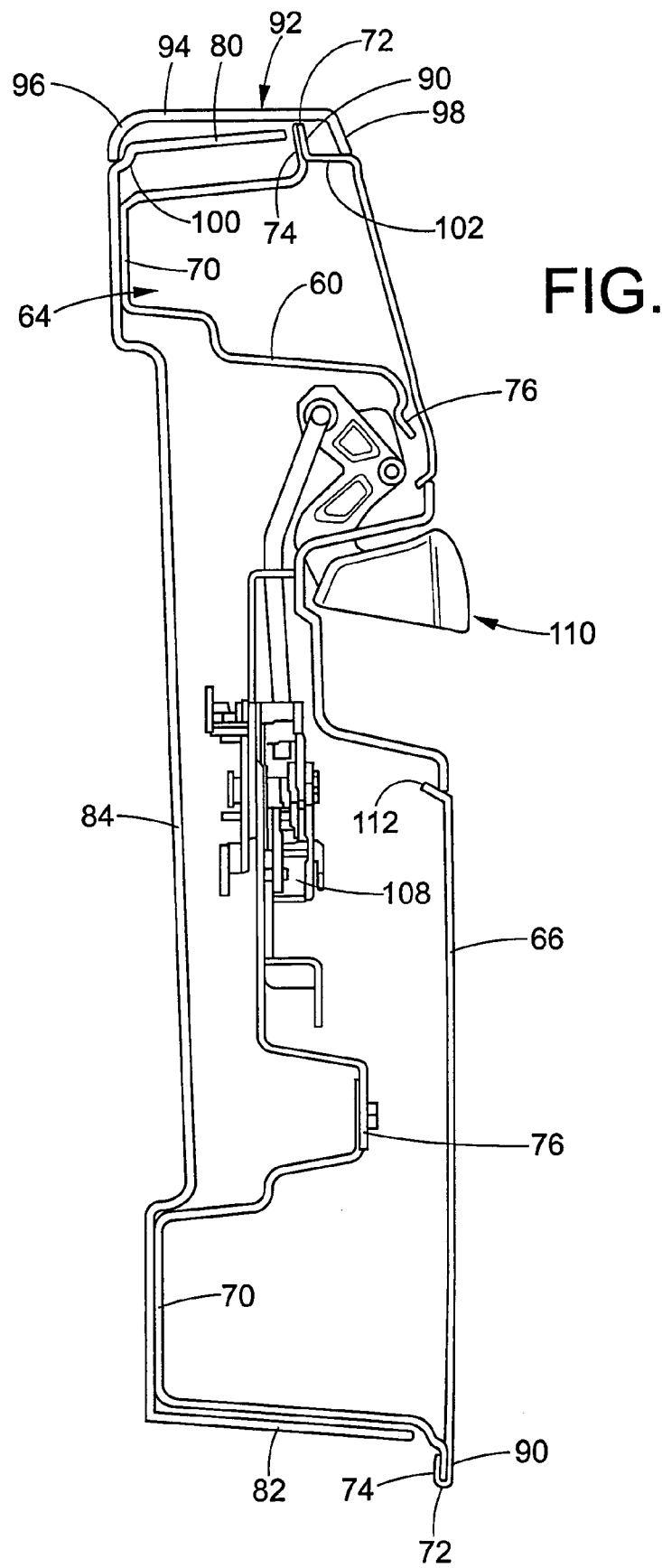
FIG. 7 is a cross-sectional view of the tailgate of FIG. 3 taken along the line 7—7.

With additional reference to FIG. 7, the tailgate frame 60 is a stamped sheet metal frame that includes a reinforced or partially deformed cross-sectional shape. In the preferred embodiment, the frame 60 is formed from a high strength steel sheet. More specifically, the stamped sheet metal frame 60 includes a raised section 70 that provides the frame 60 its reinforced shape. The raised section 70 generally extends around the entire frame 60 and is formed in an area of the frame 60 that is adjacent or defined along a perimeter 72 thereof. The reinforced shape created by the raised section 70 increases the stiffness of the frame 60 and resists bending of the frame when a load is applied to the frame, e.g., when the tailgate 10 is in the fold-open position and carries a load.

The frame 60 further includes a peripheral flange 74 located between the raised section 70 and the frame perimeter 72 that further defines the circuitous shape of the frame 60. More specifically, the peripheral flange 74 extends outwardly from the raised section 70 in a plane generally parallel to the tailgate 10. An interior flange 76 extends inwardly from the raised section 70 also in a plane generally parallel to the tailgate 10. Thus, the flanges 74,76 flank either side of the raised section providing the frame 60 with a double-hat shape. More particularly, the raised section 70 and the flanges 74,76 flanking the raised section define an embossed area located adjacent the perimeter 72 of the frame 60. The embossed area is in the form of a reinforcing rib that is adjacent or extending along each perimeter edge 32,36,44,50. The reinforcing rib increases the torsional stiffness of frame 60 as well as its overall rigidity and strength.

Figure 5:
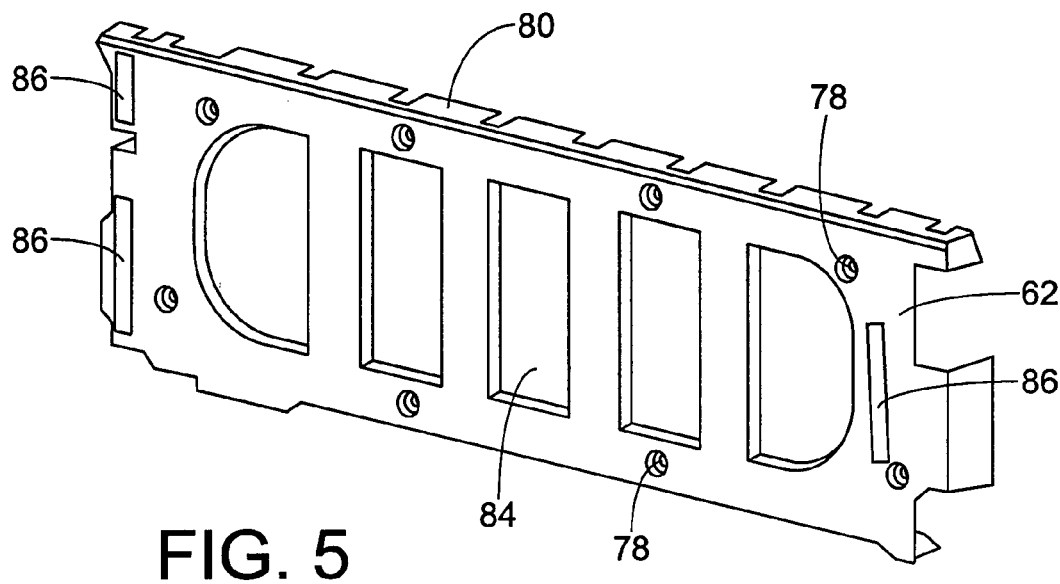
FIG. 5 is a perspective view of the cladding of FIG. 3 removed from the tailgate.

As already mentioned, the structural cladding 62 is attached to the frame 60 on the first side 64 thereof. More particularly, with additional reference to FIG. 5, the structural cladding 62 is formed of a sheet molding compound (SMC) which enables the cladding 62 to be relatively lightweight and thereby not unduly increase the overall weight of the tailgate 10. In the preferred embodiment, the SMC cladding is preferably formed of a glass-filled vinyl ester/polyester resin-based sheet and, more preferably, of a forty-five percent glass-filled vinyl ester/polyester resin-based sheet. However, it is to be appreciated that the structural cladding could, alternatively, be formed of a thermoset resin, other glass-filled materials, other SMCs or even other materials all together and all cladding material types are to be considered within the scope of the present invention.

Specifically, the structural cladding 62 is connected to the raised section 70 of the frame 60 by suitable connectors or fasteners such as bolts. The cladding 62 includes openings 78 for receiving these fasteners therethrough. Moreover, the cladding 62 includes an upper flange portion 80 that folds near or around a portion of the raised section 70 adjacent the top edge 50 of the tailgate 10 and a lower flange portion 82 that folds near or around a portion of the raised section 70 adjacent the bottom edge 32 of the tailgate 10.

The structural cladding 62 further includes a corrugated section 84 generally located on an area of the cladding 62 defined inside the raised section 70. The corrugated section 84 provides torsional and bending resistance to the tailgate 10 and serves to spread any load applied thereto to the frame 60, particularly when a load is applied to the tailgate 10 on its upper side when the tailgate 10 is in the fold-open position. Thus, the cladding 62 provides structural benefits, i.e., increased stiffness and resistance to bending, to the tailgate 10 as opposed to being merely cosmetic or appearance-defining. Optionally, seals 86 can be provided on the structural cladding 62 along the lateral edges 36,44 of the tailgate 10 for sealing any gaps between the tailgate 10 and the vertical bed edges 38,46 and preventing any rattling caused between the tailgate and the side walls 20,24.

Also mentioned above, with reference to FIGS. 6 and 7, the skin 66 is attached to an outer side 68 of the frame 60. The skin 66 is formed of sheet metal and serves primarily as an appearance part of the tailgate 10 because it covers the portion of the tailgate 10 that is generally viewable to onlookers when the tailgate 10 is in the closed position. The skin 66 includes a peripheral edge 90 that is shaped to flatly mate with the peripheral flange 74 of the frame 60. More specifically, the skin peripheral edge 90 is shaped such that, upon assembly of the tailgate 10 and mounting of the skin 66 to the frame 60, it rests against or adjacent the peripheral flange 74 and is thereby easy to connect to the frame 60 via welding. Thus, the mating relation between the skin peripheral edge 90 and the frame peripheral flange 74 provides a welding seam that is relatively easy to access and weld during assembly of the tailgate 10 which reduces or eliminates the need for any indirect welds between the skin 66 and the frame 60 thereby improving the quality of the connection between the skin 66 and the frame 60 while decreasing the manufacturing cost in making this connection. Additionally, the skin 66 can be further connected to the frame 60 by an adhesive such as mastic, an epoxy or the like.

With reference to FIGS. 3 and 7, a cap or garnish 92 forms the top edge 50 of the tailgate 10. More particularly, the cap 92 overlies the cladding 62, the upper portion of the peripheral flange 74 of the frame 60 and the upper portion of the peripheral edge 90 of the skin 66. The cap 92 is generally U-shaped and includes a top wall 94, a first leg wall 96 and a second leg wall 98. The first leg wall 96 seats in a notch 100 formed in the cladding 62. The second leg wall 98 rests on a shoulder portion 102 of the skin 66 and forms a contiguous surface with the skin 66 on an exterior side of the tailgate 10.

Figure 6:
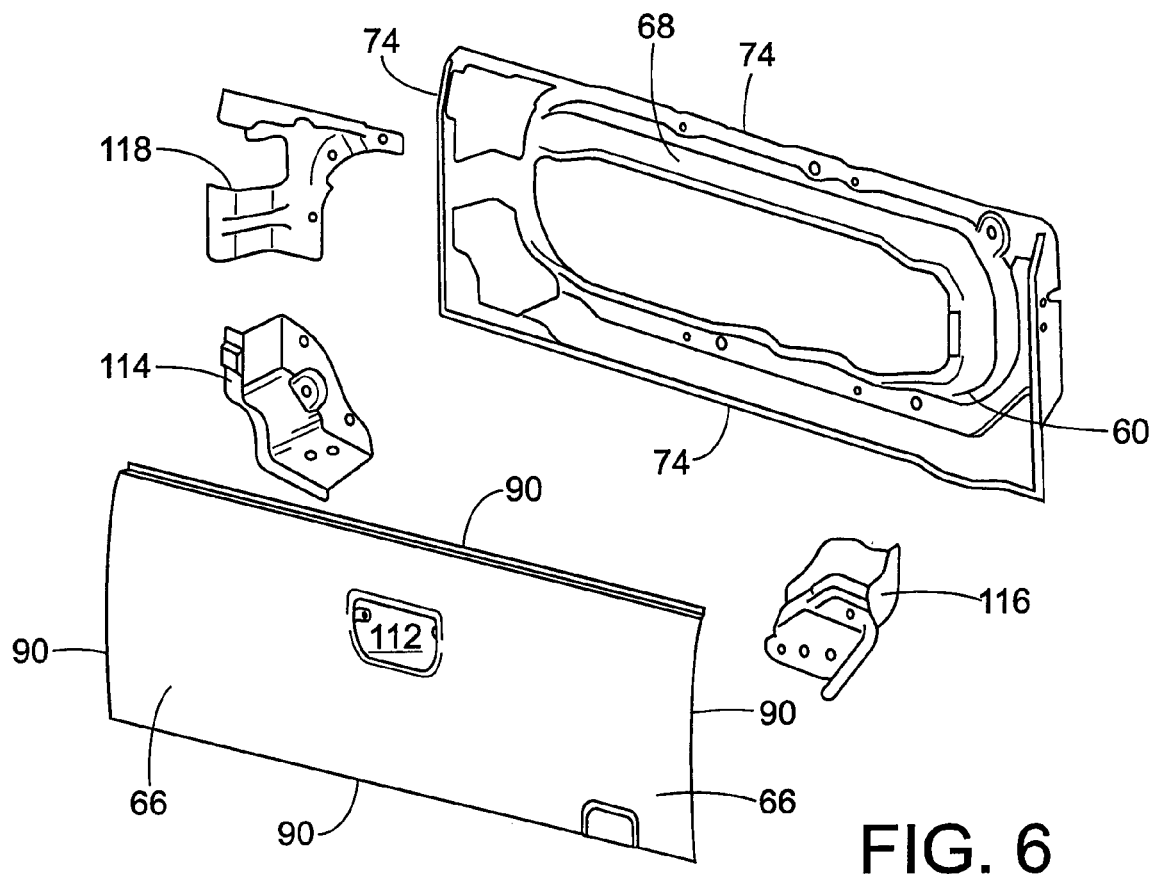
FIG. 6 is an exploded perspective view of the tailgate of FIG. 3 showing an exterior side of the tailgate having a skin.

With reference to FIGS. 6 and 7, the inner flange 76 of the frame 60 defines an interior opening or space 106 that receives a control mechanism 108 for controlling and coordinating operation between the dual-mode hinge assembly 40, the first and second selectively operable hinges 42,48 and the striker assembly 54, i.e., operating and disabling associated locks and hinges of the tailgate 10. The control mechanism 108 is secured to the inner flange 76 and includes a handle assembly 110 for operation thereof. The handle assembly 110 is accessible through an opening 112 in the skin 66.

Optionally, with specific reference to FIGS. 4 and 6, the tailgate 10 includes one or more stiffeners connected to the frame 60 for reinforcement thereof. A first stiffener 114 is positioned in the corner of the frame 60 that supports the dual-mode hinge assembly 40. A second stiffener 116 is positioned in the corner of the frame 60 that supports the first selectively operable hinge 42. A third stiffener 118 is positioned in the corner of the frame 60 that supports the second selectively operable hinge 48. The stiffeners 114–118 are connected to the frame 60 with suitable fasteners such as bolts (not shown). Alternatively, the stiffeners 114–118 could be connected to the frame 60 by welding.

Due to the irregular shape of the frame 60, the tailgate 10 has a relatively high structural strength, particularly for a tailgate having a frame formed of stamped sheet metal. The frame 60 and the corrugated cladding 62 provide the tailgate 10 an increased torsional stiffness and strength which allow the tailgate to be used as a dual-axis or dual-mode tailgate in a heavy duty application, such as a pickup truck application. The increased torsional stiffness and strength are required, at least in part, because the tailgate 10 may only be supported by a single support cable 120 (FIG. 3) when the tailgate 10 is in its fold-down position. The sheet metal frame 60 and the interior opening 106 defined thereby allow the tailgate 10 to have the structural strength advantages discussed herein while maintaining a relatively narrow overall thickness.

The invention has been described with reference other preferred embodiments. Obviously, modifications and alterations will occur to others upon reading and understanding the preceding detailed description. It is intended that the invention be construed as including all such modifications and alterations insofar as they are within the scope of the appended claims and the equivalents thereof.

Having thus described the preferred embodiments, the invention is now claimed to be:

1. A vehicle closure structure comprising:
 a frame having a double-hat shape including a raised section and an inner flange and an outer flange flanking the raised section, the raised section extending longitudinally along at least a top edge and a bottom edge of the frame;
 a structural cladding adjacent and connected to the raised section of the frame along both the top edge and the bottom edge of the frame for spreading any loads applied to the structural cladding to both the top edge and the bottom edge of the frame; and
 a skin adjacent and connected to the outer flange of the frame.

2. The vehicle closure structure of claim 1 further including:
 an opening defined approximately centrally on the frame; and
 a control mechanism directly mounted to the inner flange of the frame in the opening for operating and disabling associated locks and hinges of the tailgate.

3. The vehicle closure structure of claim 1 wherein the structural cladding includes a corrugated section having laterally extending corrugations for spreading any load applied thereto to the frame.

4. The vehicle closure structure of claim 3 wherein the corrugated section is generally located in an area defined inside the raised section and the corrugations generally extend from the top edge to the bottom edge of the frame.

5. The vehicle closure structure of claim 1 further including at least one stiffener connected to and positioned adjacent at least one corner of the frame that will have an associated hinge attached thereto for reinforcing the frame.

6. A vehicle load-carrying bed comprising:
a generally rectangular bed floor;
a front wall extending upwardly adjacent a front edge of the bed floor;
a first side wall extending upwardly adjacent a first side edge of the bed floor;
a second side wall extending upwardly adjacent a second, opposite side edge of the bed floor; and
a dual-axis tailgate positioned along a rear edge of the bed floor and extending between the first and second sidewalls, the tailgate pivotally movable about an axis generally parallel with the rear edge of the bed floor and about an axis generally parallel with a vehicle bed edge of the first side wall, the tailgate including:
a sheet metal frame having an upper embossed area and a lower embossed area for increasing the rigidity of the tailgate, the frame defining an opening between the upper and lower embossed areas for receiving a control mechanism therein;
a cladding formed of sheet molding compound attached to a first side of the frame facing the front wall, the cladding fixedly attached to the frame upper embossed area and to the frame lower embossed area;
a skin attached to a second, opposite side of the frame, the skin defining a handle opening aligned with the frame opening for receiving a handle connected to the control mechanism; and
a cap received over the frame upper embossed area and secured against the cladding and the skin.

7. A tailgate assembly mounted along an open edge of a vehicle's open load-carrying bed, the tailgate assembly comprising:
a stamped sheet metal frame having a reinforced cross-sectional shape with an inner side facing an associated vehicle's load-carrying bed and an outer side opposite the inner side, the frame pivotally connected to a wall forming the vehicle's open load-carrying bed, the frame including a first raised section extending longitudinally adjacent a top edge of the frame and second raised section extending longitudinally adjacent a bottom edge of the frame which together form the reinforced cross-sectional shape, the frame defining an opening therethrough between the first and second raised sections;
a window pane-less skin attached to the outer side of the frame; and
a structural cladding attached to the inner side of the frame and substantially covering the inner side.

8. The tailgate assembly of claim 7 wherein the stamped sheet metal frame is an integral structure formed from a single steel sheet.

9. The tailgate assembly of claim 7 wherein the stamped sheet metal frame substantially forms a tailgate structure and defines a size of the tailgate structure.

10. The tailgate assembly of claim 1 wherein a first plurality of fasteners fixedly connect the structural cladding to the frame along the top edge and a second plurality of fasteners fixedly connect the structural cladding to the frame along the bottom edge.

11. The tailgate assembly of claim 10 wherein the first and second plurality of fasteners are bolts.

12. The tailgate assembly of claim 2 wherein the skin defines a handle opening that is in registry with the frame opening, a handle actuator is disposed in the handle opening and operatively connected to the control mechanism.

13. The tailgate assembly of claim 1 wherein the cladding has an upper portion fixedly secured to the frame raised section along the frame top edge and a bottom portion fixedly secured to the frame raised section along the frame bottom edge, the cladding including a first flange extending from the cladding upper portion and extending along a raised section wall defining a height of the raised section and a second flange extending from the cladding lower portion and extending along another raised section wall defining the height of the raised section.

14. The tailgate of claim 6 wherein the cladding includes an upper and lower flange portion, the upper flange portion wraps around an upper embossed area outer wall and the lower flange portion wraps around a lower embossed area outer wall.

15. The tailgate assembly of claim 7 wherein the frame further includes a first peripheral flange located between the first raised section and the top edge of the frame and a second peripheral flange located between the second raised section and the bottom edge of the frame.

16. The tailgate assembly of claim 7 wherein the structural cladding is attached to the first raised section and is attached to the second raised section.

17. The tailgate assembly of claim 7 wherein the structural cladding includes corrugations extending between the first and second raised sections.

18. The tailgate assembly of claim 17 wherein the corrugations include recessed sections received between the first and second raised members and within a depression defined therebetween.

19. The tailgate assembly of claim 7 wherein the structural cladding is formed of a sheet molded compound (SMC).

20. The tailgate of claim 19 wherein the SMC is a 45% glass-filled vinyl ester/polyester resin-based sheet.

21. The tailgate of claim 7 wherein the structural cladding includes an upper flange portion folded around the first raised section and a lower flange portion folded around the second raised section.

22. The tailgate of claim 7 wherein the skin defines a first handle opening therethrough that is in registry with the frame opening and further defines a second handle opening adjacent the bottom edge.

* * * * *